(12) United States Patent
Michiels et al.

(10) Patent No.: US 9,851,069 B2
(45) Date of Patent: Dec. 26, 2017

(54) LIGHTING DEVICE, LENS, SYSTEM AND METHOD

(71) Applicant: PHILIPS LIGHTING HOLDING B.V., Eindhoven (NL)

(72) Inventors: Wilhelmus Petrus Adrianus Johannus Michiels, Reusel (NL); Siebe Tjerk De Zwart, Valkenswaard (NL); Marcellinus Petrus Carolus Michael Krijn, Eindoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/429,394

(22) PCT Filed: Sep. 13, 2013

(86) PCT No.: PCT/IB2013/058539
§ 371 (c)(1),
(2) Date: Mar. 19, 2015

(87) PCT Pub. No.: WO2014/045178
PCT Pub. Date: Mar. 27, 2014

(65) Prior Publication Data
US 2015/0219305 A1    Aug. 6, 2015

Related U.S. Application Data

(60) Provisional application No. 61/703,319, filed on Sep. 20, 2012.

(51) Int. Cl.
*F21V 17/02*    (2006.01)
*F21V 5/00*    (2015.01)
(Continued)

(52) U.S. Cl.
CPC .......... *F21V 5/007* (2013.01); *F21S 48/1208* (2013.01); *F21S 48/1225* (2013.01);
(Continued)

(58) Field of Classification Search
CPC .. F21S 48/1208; F21S 48/1216; F21S 48/125; F21S 48/1275; F21S 48/1323; F21S 48/1376; F21S 48/1705
See application file for complete search history.

(56) References Cited

U.S. PATENT DOCUMENTS 4,740,875 A * 4/1988 Wyckoff ............. F21S 48/1233
362/309
4,951,179 A 8/1990 Machida
(Continued)

FOREIGN PATENT DOCUMENTS

DE    202004009121 U1    9/2004
JP    2001272629 A    10/2001
(Continued)

*Primary Examiner* — Alexander Garlen

(57) ABSTRACT

A lighting device comprising at least four optical devices. Each optical device has an associated light source and comprises a first surface with a plurality of micro sized facets. Each facet has a respective orientation and said plurality of facets has an optical axis which extends parallel to the normal vector to an average orientation of all said respective orientations. The optical devices are divided over at least two sets of optical devices which are designed to mutually issue a different pattern during operation as the optical devices of different sets are arranged in a mutually alternating manner.

19 Claims, 14 Drawing Sheets

(51) Int. Cl.
*F21S 8/10* (2006.01)
*G02B 19/00* (2006.01)
*F21V 7/00* (2006.01)
*F21W 101/10* (2006.01)
*F21Y 115/10* (2016.01)

(52) U.S. Cl.
CPC ....... *F21S 48/1323* (2013.01); *F21S 48/1376* (2013.01); *F21S 48/1705* (2013.01); *F21V 7/00* (2013.01); *G02B 19/0066* (2013.01); *F21W 2101/10* (2013.01); *F21Y 2115/10* (2016.08); *Y10T 29/49826* (2015.01)

(56) References Cited

U.S. PATENT DOCUMENTS

| | | | | |
|---|---|---|---|---|
| 4,991,073 A * | 2/1991 | Levin | ........................ | G02B 3/08 362/309 |
| 5,477,436 A * | 12/1995 | Bertling | .................... | B60Q 1/00 362/231 |
| 6,333,688 B1 * | 12/2001 | Brown | ................... | B60Q 1/444 340/472 |
| 6,520,669 B1 | 2/2003 | Chen et al. | | |
| 7,150,552 B2 * | 12/2006 | Weidel | ................... | B60Q 1/085 362/464 |
| 7,686,474 B2 * | 3/2010 | Chou | ......................... | F21K 9/00 362/237 |
| 2006/0250809 A1 * | 11/2006 | Strazzanti | ................ | B60Q 1/00 362/538 |
| 2007/0223095 A1 | 9/2007 | Brown | | |
| 2013/0265755 A1 * | 10/2013 | Adams | ...................... | F21V 5/04 362/235 |

FOREIGN PATENT DOCUMENTS

| | | |
|---|---|---|
| JP | 2008010228 A | 1/2008 |
| JP | 2010529631 A | 8/2010 |
| WO | WO2008152561 A1 | 12/2008 |
| WO | 2014045147 A1 | 3/2014 |
| WO | 2014045158 A | 3/2014 |
| WO | 2014045168 A | 3/2014 |

* cited by examiner

LIGHTING DEVICE, LENS, SYSTEM AND METHOD

CROSS-REFERENCE TO PRIOR APPLICATIONS

This application is the U.S. National Phase application under 35 U.S.C. §371 of International Application No. PCT/IB13/058539, filed on Sep. 13, 2013, which claims the benefit of U.S. Provisional Patent Application No. 61/703,319, filed on Sep. 20, 2012. These applications are hereby incorporated by reference herein.

FIELD OF THE INVENTION

The present invention relates to a lighting device with micro sized facets.

BACKGROUND OF THE INVENTION

Conventional techniques for homogenizing light make use of arrayed micro-lenses, diffractive diffusers, ground glass diffusers, and holographically-generated diffusers. Micro-lens arrays homogenize light by creating an array of overlapping diverging cones of light. Each cone originates from a respective micro-lens and diverges beyond the focal spot of the lens. In the conventional arrays, the individual lenses are identical to each other. Ground glass diffusers are formed by grinding glass with an abrasive material to generate a light-scattering structure in the glass surface.

Micro-lens arrays, ground glass diffusers and holographic diffusers all have the disadvantage of not being able to control the angular spread of the homogenized, diverging light. Light in general has an angular spread that is fairly uniform over a desired angular region, but the boundaries of the angular region are blurred. With the conventional diffuser methods, the energy roll-off at the edge of the desired angular spread can extend well beyond this region.

Diffractive diffusers can be used to control the angular spread of the output light, but such diffusers are limited with respect to the amount of spread that they can impart to the output light. Due to fabrication limitations for short wavelength sources, visible or below, and limitations in the physics of the structures for longer wavelengths the maximum angular spread is limited. Further, diffractive diffusers used in their traditional binary form can include a significant amount of background energy and the patterns must be symmetric about the optical axis.

To overcome said disadvantages of these conventional devices, US20070223095 discloses an optical device having a plurality of square facets formed by a plurality of optical elements. The facets are used to direct portions of an incident light beam in predetermined, respective directions. The facets are formed adjacent to each other in a two-dimensional array. The locations of the facets in the array are random with respect to the directions of the corresponding light beam portions. It is a disadvantage of the known lighting device that it has a relatively poor performance and/or is relatively large.

SUMMARY OF THE INVENTION

It is an object of the invention to provide a lighting device of the type as described in the opening paragraph with an improved performance. It is another object of the invention to provide for a method of making an improved lighting device. This object is attained by an lighting device of the type as described in the opening paragraph which comprises at least four optical devices each optical device has an associated light source, and each optical device comprises a first surface with a plurality of micro sized facets, each facet having a respective orientation, said plurality of facets having an optical axis which extends parallel to the normal vector to an average orientation of all said respective orientations, the optical devices are divided over at least two sets of optical devices, the sets of optical devices are designed to mutually issue a different pattern during operation, and the optical devices of different sets are arranged in a mutually alternating manner. The lighting device comprising a first set of optical devices comprising identically arranged plurality of facets, and a second set of similarly optical devices comprising identically arranged plurality of facets, however, different from the other sets of optical devices. Both sets being in a mixed arrangement, i.e. in an alternating, interdigitated manner or similar arrangements in other configurations and ratio of in number of optical devices in the first set and the second set, for example of 1:2 or 1:3. Such an essentially interdigitated (or more or less alternating) arrangement of two combinations of LEDs and associated optical devices is in particularly suitable in luminaires enabling it to issue a narrow beam light (spot-like), a broad beam light (flood light), for example a batwing-shaped light beam, or the combination of narrow and broad beam light. Yet the luminaire in all operation conditions has a practically constant appearance and emits light in a homogeneous way from its whole light emission window. The lighting device could well comprise three, four, five or up to ten sets, but essentially different, optical devices, all alternatingly arranged. The number of LEDs and their respective associated optical devices amounts for example 25, 50 or 100 LEDs and 25, 50 or 100 essentially identical optical devices on one lighting device. Due to the alternating arrangement of the sets of optical device the lighting device is relatively compact.

Compactly arranged in this respect means that within a group of facets, the facets are not arranged widespread but are closely arranged together as one, for example in that at least 50% of the facets is fully surrounded or bordered by facets of the same group or, for example, in that the group of facets has a surface S and a perimeter P and that the ratio P to $\sqrt{S}$ is at the most 6. Neighboring in this respect means that within the group of facets essentially all the facets of the group are directly connected to each other via facets of their group.

The optical device is formed of a tiled array of group of facets, where each group has a number of facets, for example (pseudo-) randomly arranged facets, a pattern may be formed by individual matching sub-patterns issued by contributions of (a) respective group(s). Facets are determinable by a facet surface with a specific orientation, the facets surface being bounded by a perimeter, and generally bordering adjacent facets in a non-continuous way, i.e. the orientations of the adjacent facet surfaces being different. Transition surfaces connecting adjacent facets at their perimeters may have significant heights due to the mutually different orientations of the adjacent facet surfaces. Said transition surfaces may not be perfectly formed and hence may not extend perfectly steep, however, these transition surfaces are not to be considered as separate facets. An embodiment of the optical device according to the invention is characterized in that each group of facets is associated with a respective sub-pattern, with the relative position of the group of facets on the optical device being essentially equal to the relative position of the sub-pattern in the displayed pattern during operation of the optical device. Instead of randomly redirecting light rays of an incident light beam in predetermined, respective directions, the redirection of light rays is done groups-wise in the optical device of the invention. In one way to describe the principle of said redirection of light rays by the optical device, a Cartesian coordinate system is to be considered, with the x-y axes perpendicular to the optical axis, with x=0 and y=0 on the optical axis and viewing downstream, i.e. along the optical axis in the direction from the light source towards the displayed pattern. Light rays incident on the first group of facets having said first group optical axis and which group, for example, is located in a first quadrant of the coordinate system of the optical device, will mainly, for example for at least 75%, be redirected (pseudo-) randomly in the direction of said first group optical axis to the corresponding first quadrant of the displayed pattern, the remaining 25% may be projected (pseudo-) randomly in one or more of the other quadrants. Similar reasoning applies for the second, third and fourth group of facets located in respectively the second, third and fourth quadrant, which respectively redirect light rays along their respective group optical axis to the second, third and fourth quadrant of the displayed pattern, respectively. If the displayed patterns requires a spread of light by the optical device over a relatively large angles with respect to the optical axis (like spread over a cone with a large apex angle), each quadrant and group optical can de sub-divided yet further, for example into halves or into four sub-quadrants each with its respective associated group optical of facets. A similar relationship between sub-quadrants in the optical device and the displayed patterns could then be maintained. Thus, relatively large (or even too large) refraction of light beams is counteracted or even avoided and the tilt of the facets could be reduced compared to fully random arranged facets. Thus the efficiency of the optical device is improved as less reflection occurs at the facet surface, since the angle of incidence of light rays on said facet surface on average is closer to the normal to said facet surface. To further reduce undesired reflection of light by the optical device, the direction of light as issued by a point-like light source is at relatively small angles with the group optical axis of the group of facets on which said issued light is incident. In other words, on average the light seems to propagate somewhat more in the same direction before and after being passed through the optical device of the invention than is the case for propagated light through the known optical device. Furthermore, each facet has a perimeter edge by which it borders its adjacent facet, said perimeter edge is a source for distortion of the displayed pattern. As a result of the abovementioned inventive technical features, distortion of the displayed pattern/image caused by perimeter edges is reduced as the average height of the perimeter edge is lower than in the known optical device without said group optical partition but with fully randomized facet orientations, hence the quality of the image is improved.

As the part of the image associated with a group of facets is to be built up by said group of facets in a desired resolution/detail, an embodiment of the optical device is characterized in that the number of facets comprised in a group of facets is at least 100. The desired minimum number of facets comprised in the group depends on the size, complexity and desired detail of the part of the image built up by said group, therefore said number of facets in the group could easily amount 1000 or even 10.000.

An embodiment of the optical device is characterized in that the at least first and second group of facets essentially have the same size and/or the same shape. In this way it is enabled to obtain a relatively simple partition of the first surface of the optical device in groups. Optionally said groups are mutually separated by small spacings, or the groups form a superstructure, for example in which each group forms a superfacet, of the first surface. Furthermore the optical device with groups of essentially the same size and/or shape is more balanced with respect to redistribution/redirection of light. In this respect its appeared favorable when the respective number of facets in the first group of facets and the respective number of facets in the second group of facets is in the range of 1:1 to 1:10. Said groups furthermore are relatively simple distinguishable from each other when they are separated by spacings thus enabling easy manipulation/correction of a specific group. If groups of facets are not directly distinguishable or determinable on the optical device, methods to (virtually) divide the plurality of facets on the first surface into groups of facets is to consider one selected facet, preferably not at the border of the first surface. At least all the facets that can be reached in three steps over adjacent/bordering facets or that are within a distance of <=3* averaged facet size from said selected one facet are considered to be part of said group of facets. This method automatically renders the group of facets to be compactly arranged and have more or less the same size and shape. Note that for determination of group optical axes and angles β between said group optical axes, a facet cannot be part of more than one group of facets.

An embodiment of the optical device is characterized in that essentially each facet within a group has a tilt angle $\alpha_t$ with the respective group optical axis, wherein said tilt angle $\alpha_t$ is within a range determined by the equation:

$$\alpha_t <= 0.8*\alpha_c, \text{ preferably } \alpha_t <= 0.6*\alpha_c,$$

in which $\alpha_c = \arcsin(n2/n1)$ and $\alpha_c$ is the critical angle for total internal reflection with $n_1$ is a higher refraction index and $n_2$ is a lower refraction index.

In particular this criterion is applicable on refractive optical devices, but to a certain extent also on reflective optical devices. Limiting the upper limit range of tilting angles only to angles significantly lower than $\alpha_C$, i.e. less than $0.8*\alpha_c$, will have the effect that the perimeter edges have an absolute lower upper limit for their maximum height compared to the known similar optical device without said limitation in tilt angle. This generally will result in an average lower height of the perimeter edges and hence in a lower perimeter edge surface to facet surface ratio and hence in an improved performance of the optical device over the known optical device. Furthermore, a light beam incident on a surface at angles higher than the critical angle for TIR always is partly reflected and partly transmitted. Hence, as in the optical device of the invention the facets in general are oriented more transverse to the incident light beam than in the known optical device, less light will be reflected and more light will be transmitted, thus enhancing the efficiency of the inventive optical device over the known optical device. Furthermore if the optical device is characterized in that $\alpha_t <= 0.6*\alpha_c$, the tilt of the facets with respect to the optical axis is thus limited to relatively low values, which tilt, however, is yet sufficient to redirect in desired directions light originating from a light source issuing a parallel beam. By this measure the performance of the optical device is further improved with respect to efficiency, reduction in glare and thickness of the optical device. Light originating from a point source impinges as a diverging light beam on the optical device at a relatively wide angle range. Hence, for fully random refraction of this diverging light in desired directions, generally facets with larger tilt angles are required in the known device. However, in the optical device according to the invention the occurrence of unfavorable larger tilt angles is yet counteracted by the sub-division of the first surface in said groups of facets. Limiting the tilt angle to $\alpha_t <= 0.8*\alpha_c$ can be considered as an invention as such.

Suitable high refractive index materials for the optical device are, for example, glass, PMMA, polyethylene, polycarbonate, the low refractive index material generally is air.

To obtain sufficient randomizing effect by the optical device, preferably adjacent first and second facets within a group of facets generally have a minimum mutual difference in orientation and thus to direct incident light beams in significantly different directions. Said minimum mutual different orientation can be defined as an angle between the normal vectors of said first and second facet surface, this angle being at least 3°. However, not all the adjacent facets need to have a different orientation as, for example, with adjacent facets with the same orientation a watermark pattern can be provided to the optical device.

The optical device may be formed of transparent or reflective materials. The individual facet surfaces and/or a combined plurality of facet surfaces may be flat and planar or they may be curved and non-planar. According to another aspect of the invention, the optical device may be used to form an angular pattern. The optical device may be arranged to split the incoming beam into sub-beams. Generally an optical device comprises at least 100 facets, typically 5.000 or 10.000 facets, even up to 100.000, 1.000.000 facets or more. Appropriate phase tare surfaces may be used to divide the facets surfaces into stepped or terraced facet surfaces as is known in the prior art, to thereby reduce the overall thickness of the optical device. Furthermore, the ratio between perimeter edge ($P_f$) and facet surface ($S_f$), defined as $P_f/\sqrt{S_f}$ ratio, preferably is at the most 4.6, to counteract undesired displayed pattern distortion effects as possibly caused by a relatively large amount of perimeter edge compared to the facet surface.

Preferably for at least for 85% of the adjacent facet surfaces, said facets surfaces of adjacent facets are non-continuous, more preferably the normal vectors are mutually angled at at least 3°, preferably at at least 5° or at least 7°. More diverged directions of the redirected light by adjacent facets are thus obtained which typically enhances a desired effect of homogenization by the optical device.

An embodiment of the optical device is characterized in that of the high refractive index materials the high refraction index $n_1$ is at least 1.45 as then less tilt of the facets is required for the same refraction compared to materials having a refraction index of less than 1.45, (examples of materials with a refraction index of less than 1.45 are fluoropolymers for example PVDF (=polyvinylidene difluoride, $n_1$=1.41), ETFE (=Ethylene tetrafluoroethylene, $n_1$=1.40), or Cytop (=cyclized Transparent Optical Polymer, $n_1$=1.34)). Said less tilt generally reduces the edge height and hence improves the performance of the optical device. Suitable materials with a refraction index of at least 1.45 with respect to air for $\lambda$=589 nm are SiO2 (fused silica or quartz glass, $n_1$=1.45), various types of glass ($n_1$ ranges from about 1.45 to 1.9), PMMA (Polymethylmethacrylate, $n_1$=1.49), PET (polyethylene terephthalate, $n_1$=1.57), and polycarbonate ($n_1$=1.59).

An embodiment of the optical device is characterized in that it is made in one piece. Preferably from a foil or plate as these materials are relatively easy to handle, and relatively easily adaptable in shape and size to substrates and/or lighting devices. The advantage of being in one piece is that cumbersome mutual attachment of the plurality of microwedges, as is done in some of the known optical devices and which are parts corresponding to the plurality of facets of the present invention, is avoided. In particular the use of material with high refractive index and the limitation in tilt angle of the facets enable the use of relatively thin foils as optical device. Said facets are easily obtainable in sheet, plate or foil material via laser ablation, thus the plurality of facets being formed in sheet, plate of foil material made in one piece. Said one piece material could easily be shaped into a desired shape, for example as a body of revolution of a branch of a parabola or ellipse, alternatively it could be slightly wavy, curved or flat.

An embodiment of the optical device is characterized in that it comprises a sub-set of facets, forming a pattern, of the plurality of facets, all of the facets of the sub-set mutually having essentially equal orientation, i.e. an equal tilt angle and azimuth angle, preferably the sub-set comprises in numbers 1% to 15% of the plurality of facets. Thus the sub-set of facets forms a type of meaningful pattern, for example a watermark pattern of the optical device, which could serve as an identification label and/or to provide readily readable information about the optical device. Alternatively or simultaneously it could serve to detect and hence discourage manufacture of Chinese copies by third parties. To that end the watermark could be provided in an unobtrusive way, for example by limiting it to comprise at the most 5% of the plurality of facets. If the number of the sub-set is higher than 15% it is no longer unobtrusive and is more likely to exhibit visual degradation of the quality of the optical device. If the number of the sub-set is less than 1% it becomes difficult to discern the watermark and detection is less evident, furthermore the risk on circumvention has increased as an essentially new design for the lens is no longer required and only a relatively low number of facets have to be altered to break up the watermark. Alternative ways to create a watermark are by providing gaps or spacings between the facets, or by making small scratches on the facets, ribbed facets, frosted facets or by coloring the facets, however, without influencing to an observable degree (by ordinary users) the performance of the optical device. Providing the optical device with a watermark according to the abovementioned measures can be considered as an invention as such.

The invention further relates to a lens comprising at least one optical device according to the invention. Lenses find wide application in display devices, projection devices, and lighting devices like for example luminaries or car headlight systems. Said lenses are extremely suitable for controlling the light beam issued by said devices.-The lens may comprise multiple mutually equal optical devices as sub-devices. According to this aspect of the invention, an optical device is formed of a tiled array of sub-devices, where each sub-device has (pseudo-) randomly arranged facets. Such a tiled optical device may be used, for example, to handle large diameter input beams or to handle a plurality of separate (diverging) beams. It is thus enabled, for example by using a plurality of LEDs through superposition of the beams generated by each sub-device and associated LED, to generate relatively very homogeneous light beams or beam patterns with relatively very sharp edges between light and dark areas, which is of particular relevance for the requirements of the typical dim light beam as issued by car headlight systems. Each sub-device (tile) then generates the whole pattern essentially in the same way, for n sub-devices the patterns is then n times projected with essentially full overlap. It is thus enable to design car headlight devices not using one very bright light source, but a matrix of less bright light sources instead, and yet obtaining a specific dim headlight beam light pattern fulfilling the requirements posed on such dim car headlight beams.

An alternative embodiment of the lens is characterized in that it comprises multiple mutually different optical devices as sub-devices. As in the previous embodiment each sub-device (tile) may generate the whole pattern, be it now in mutually different ways. For n sub-devices the pattern is then n times projected with essentially full overlap, typically n is in the range from 4 to 100, for example 49 or 60, but, for example, it could amount 400. The tiled device may be used, for example, to handle large diameter input beams or to handle a plurality of separate (diverging) beams as issued by a plurality of LEDs. Similar to the previous embodiment, this embodiment is also very suitable in motor headlight systems. Furthermore, in such a device, as well as in the previous one, possibly present small distortions in the light beam due to possibly present defects in a sub-device, are averaged out. This is of relevance for the image edges of the dark and light areas of the displayed image. The shape of each facet as present on the optical device/lens, as it were is displayed as said shape, often for example a polygon such as a square, rectangle or hexagon, in the displayed image, resulting in a stepped profile of said edges. Because of mutually slight displacement of superposition of said beams it is enabled that said edges are appearing less stepped but are appearing more fluent/smooth, thus enhancing the virtual resolution of the displayed image. The magnitude of said displacement is chosen in dependency of the desired size and desired resolution/detail of the displayed image. This principle of superposition with the optical device/lens of the invention could be considered as an invention as such. The size of each tile may be slightly different from the neighboring tiles to eliminate interference effects that might otherwise be caused by a repeating pattern. The intensity of light transmitted through each tile may be different, which may cause a slight change in the amount of energy imparted to each sub-pattern location in the pattern. This effect is reduced, however, by the random placement of facets within each tile. Alternatively each sub-device may generate a respective part of the pattern, i.e. a sub-pattern, the sub-patterns together forming the whole pattern. If the number of sub-patterns in the pattern is less than the number of facets desired to be arranged in the optical device, then some of the facet surfaces may have the same tilt angle, azimuth angle and optionally even the same size. The similar facets then will direct light to the same location or sub-pattern region or location. However, the facet surfaces with similar tilt angle and azimuth angle preferably are not to be located adjacent one another.

The invention further relates to a lighting device comprising at least one light source and at least one optical device according to the invention. Lighting devices could, for example, be a lamp/reflector unit, a luminary, or display device. In the case of a lamp/reflector unit, a light emitting element is provided inside at the focal point of a parabolic reflector and said reflector is closed by a, preferably exchangeable, plate comprising the optical device. The combination of light emitting element and reflector form a light source which could serve as a generator of a parallel light beam incident on the plate. Hence the light issued by the lamp/reflector unit is easily controllable by simple selection/exchange of the plate. Similar constructions are obtainable by luminaries and direct lit or side-lit backlights for display devices which issue parallel beam of light onto the optical device. Alternatively, the lighting device is characterized in that the lighting device is a LED comprising a LED dye and with the optical device/lens as primary optics. Generally the LED dye is provided with a dome lens as a first, primary optics. When the optical device is the primary optics of the LED, each individual LED could be given a desired beam pattern issued by each individual LED. The design of the optical device depends on the ratio in size of the LED dye and the dome. If, for example, the size of the dye (=light emitting element) is small compared to the dome (=optical device), for example the hemi-sphere shaped dome has a diameter at least a factor 10 in larger, the light emitting element is roughly taken by the optical device as a point light source when the LED die is positioned in the centre of the (hemi-) sphere dome. A sub-pattern of the pattern is then formed by an associated group of facets redirecting a sub-beam of the beam of light issued by the light emitting element. Alternatively, if, for example, the size of the die (=light emitting element) and the dome (=optical device) are about of the same size, for example the hemi-sphere shaped dome has a diameter at the most a factor 2 larger, the light emitting element could be treated as a source issuing a parallel beam of light. In this case the optical device is a lens preferably consisting of only one optical device with only one unit and a limited number, for example, 2, 3, or 4, groups of facets. In the ratio 2 to 10 a transition area from point source to a light source issuing a parallel beam applies, and hence in the design of the optical device the specific dimensions of the light emitting element have to be taken into account.

The present invention also relates to an optical system that has a plurality of light sources and at least one optical device. Alternatively, a plurality of optical devices is provided, even to such an extent that each light source is associated with a respective optical device. The plurality of light sources mutually may cooperate to generate a single pattern by overlapping of the pattern issued by each individual light source, hence enabling easy dimming of the lighting pattern. Alternatively, a pattern may be formed by individual contributions of matching sub-patterns issued by individual light sources, thus enabling an easy change of the patterns by independently switching of at least one individual light source or a sub-set of the plurality of light sources. In a preferred embodiment of the invention, adjacent facets may be formed with different three-dimensional conjugations.

The present invention also relates to a method of making a multi-faceted optical device. The method includes the steps of:

(1) selection of a desired pattern to be displayed, (2) dividing the pattern into sub-patterns with specific locations, (3) determining groups of facets and configurations for facets comprising group optical axis for (re-)directing beam portions to the sub-pattern locations, taking into account that for at least one combination of a respective first group optical axis of the first group of facets with a respective second group optical axis of the second group of facets, said first group optical axis and said second group optical axis are mutually angled at an angle β of at least 5°, (4) generating a plurality of facets, according to the determined configurations.

Optionally, to yet another aspect of the invention, groups of facets, tilting angle and azimuth angle for the facet surfaces are calculated by a programmed general-purpose computer based on the locations of the respective sub-pattern location in the desired pattern, this is, for example, the case with the arrangement of individual facets of the groups of facets. Specific algorithms and software to translate a desired light pattern into a design for the corresponding array of facets are developed. A prototype of a thin transparent foil with facets engraved into it has been realized, making use of this technology. The technology requires imaging a mask with the layout of the facets onto a layer of transparent plastic by means of a pulsed laser beam and a projection lens in between the mask and the layer of transparent plastic. Material is removed from the transparent plastic at the locations where the laser beam hits the plastic thus to create the specific tilt angle and azimuth angle of the facet surfaces. The higher the laser fluence, the more material is removed by (laser-) ablation. The facets were designed such as to transform a parallel beam or a point-source like beam into a pattern of light in the far field on a wall.

Thus, the present invention provides a method and device for controlling a beam of light. The invention makes use of micro-structures partitioned over a surface of a plurality of facets where practically each optical element or facet surface is different from its adjacent neighbor in size, rotational orientation and tilt angle (slope). The partitioned different facets can control, for example homogenize, light beams issued by light sources without the disadvantages of the prior art. Various combinations and alterations to the partitioned facets may include: adding a phase bias to the facet to further scramble the incoming light beam and/or adding a lens function to the first surface comprising the plurality of facets surface or to a back surface, positioned opposite to the first surface, of the optical device.

The smaller the angular spread of the light that crosses the facets, the sharper the features that can be projected onto a wall. An angular spread of less than 20° FWHM (full-width-at-half-maximum) is preferred. More preferred is an angular spread less than 10°. Even more preferred is a spread less than 5°.

The larger the size and the tilt (slope) of a facet surface, the larger the facet height. A maximum height that does not exceed 100 μm is preferred. The advantage of a limited height is the possibility of using (hot) embossing as a technology for mass manufacturing at low cost. It also enables roll-to-roll processing for mass-manufacturing at low cost. The lowest cost solutions are expected to be those that are based on foil-shaped optics: it is foreseen that a thin transparent optical foil provided with a dedicated micro-structured surface can fulfill the optical function of shaping the beam of light emitted by the LEDs. It is the benefit of this invention that manufacture of such a low-cost solution is enabled.

Facets that have a size less than 250 μm are preferred: a limited facet size implies a limited facet height and the possibility to have a large facet slope without having a large facet height. A large facet slope implies being able to redirection light into large angles. The minimum facet size preferred is about 25 μm. Smaller facets are more difficult to make in low-cost solutions and may result in undesired diffraction of the light crossing them.

The present invention may be used to perform beam splitting operations, homogenize light sources, and/or to redirect light in a given direction, for example the light beam exiting in the first and second directions contributing to a portion of a predetermined pattern. The optical device may be provided onto a substrate, for example a plate or a sheet, the substrate comprising a smooth regularly shaped exterior surface opposite to the facet surface of the optical device.

These and other advantages and features of the invention will become apparent from the following detailed description of the invention which is provided in conjunction with the accompanying drawings.

DETAILED DESCRIPTION OF PREFERRED EMBODIMENTS

Figure 1A:
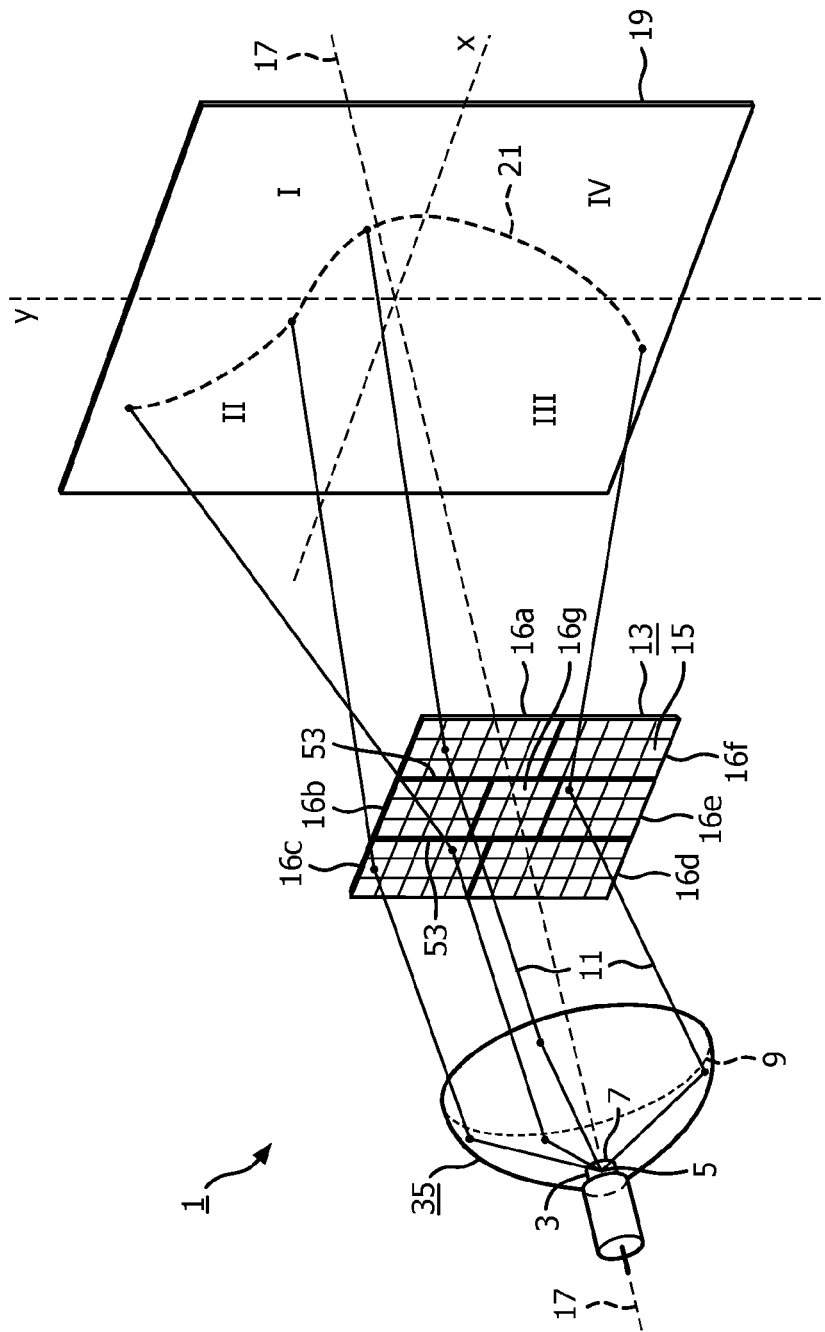
FIG. 1A shows a schematic perspective view of a lighting device according to a first embodiment of the invention.

Referring now to the drawings, where like reference numerals designate like elements, there is shown in FIG. 1A a schematic perspective view of a lighting device 1 according to a first embodiment of the invention. The lighting device comprises a lamp/reflector unit 35 as a light source 3 with a light emitting element 5, preferably a point-shaped light, for example a LED, or a high pressure gas discharge lamp, such as a UHP-lamp, positioned in a focal point 7 of a reflector body 9. The lamp/reflector unit, during operation, generates a parallel beam of light 11 which subsequently is incident on a transparent optical device 13. Said optical device being positioned transverse to the parallel beam and comprises a plurality of facets 15 sub-divided into at least a first 16a and a second group of facets 16b and further groups of facets 16c-16g, which facets for the sake of simplicity are shown as squares, the average orientation of the facet surfaces defines an optical axis 17. Each group of facets has a respective perimeter 53. Each facet via refraction at its facet surface redirects a light beam (or light ray) incident on said facet in a specific direction towards a display screen 19, shown with a Cartesian coordinate system comprising an x- and an y-axis. Said specific direction being dependent on the tilt angle and azimuth angle, measured with respect to the positive y-axis of said facet surface and is chosen such that, if desired, a homogenization in the light intensity is obtainable of a displayed pattern 21, or alternatively, that a patterns is obtainable with predetermined values of shades and/or parts with predetermined (different) values of light intensities. In the figure each group of facets 16a-g is associated with a respective sub-pattern 39 of the displayed pattern 21. The relative position of a group of facets on the optical device is associated with the "same" relative position of the sub-patterns in the displayed pattern. Hence, as an example shown in the figure, the first group of facets 16a is located in a first quadrant I of the first surface and is associated with a sub-pattern 39 located in a first quadrant I of the pattern. In the figure the optical device is made of PMMA.

Figure 1B:
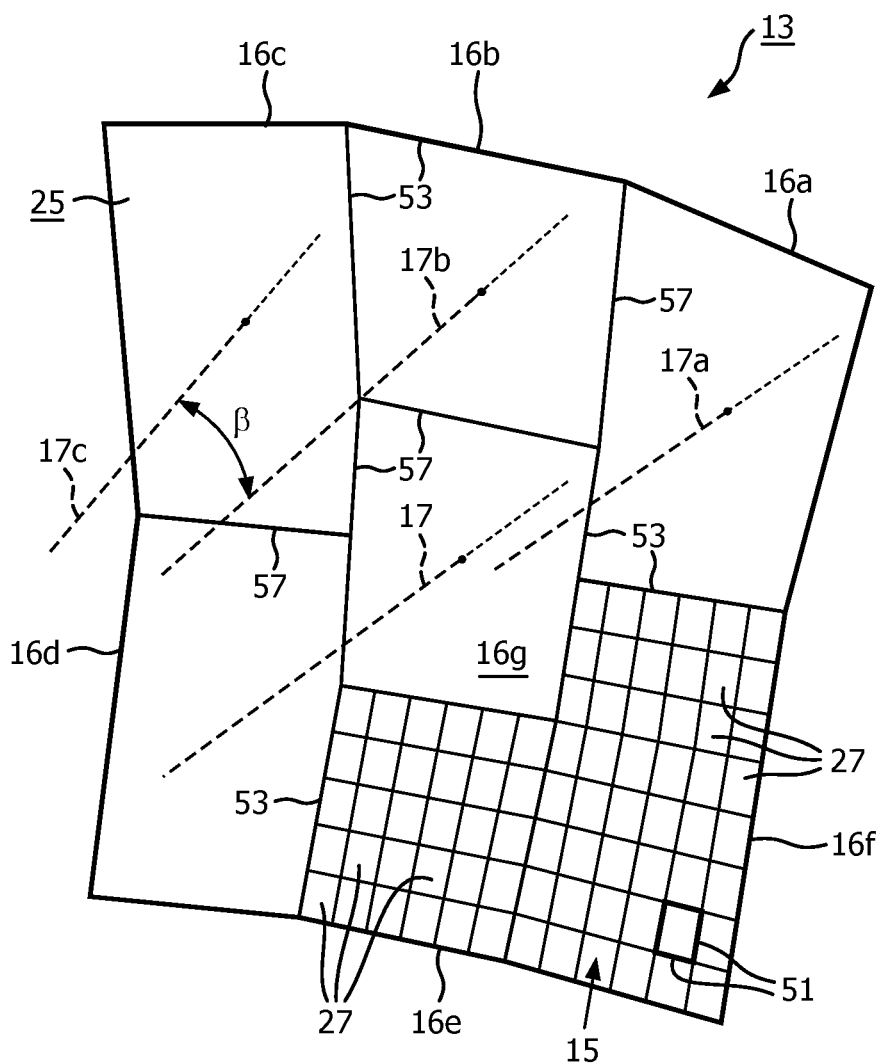
FIG. 1B shows the optical device of FIG. 1A in more detail.

FIG. 1B shows the optical device 13 of FIG. 1A in more detail. The optical device is slightly concavely curved towards a light source (not shown), has an optical axis 17 and comprises a first surface 25 with a plurality of facets 15. Said first surface is subdivided into groups of facets 16a-16g, with each group of facets having its respective perimeter 53. The separations between groups of facets are indicated by bold lines, representing small spacings. As shown in the figure, each group forms a superfacet 61 of the first surface 25. Each group of facets has a respective group optical axis 17a-17g (only shown are 17a-17c) as defined by the normal to the average orientation of facets 27 belonging to a respective group of facets. Each facet having a respective perimeter edge 51. The group optical axes are mutually angled at a respective angle β, as shown in the figure for groups of facets 16b and 16c with respectively axes 17b and 17. The angle β between axes 17b and 17c is about 10°, respective angle β between other pairs of group optical axes need not all have the same value but may have different values.

Figure 2:
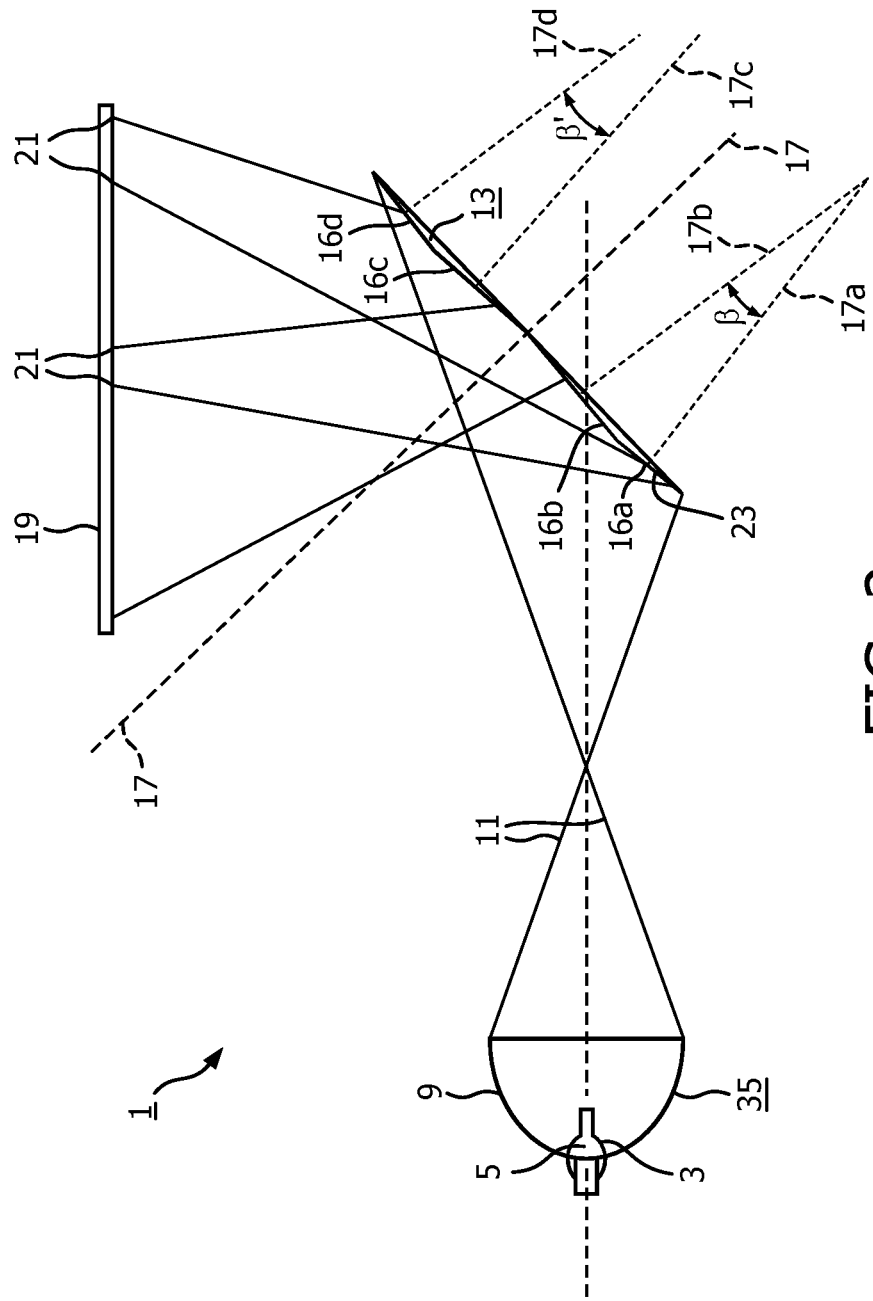
FIG. 2 shows a schematic side view of a lighting device according to a second embodiment of the invention.

FIG. 2 shows a schematic side view of a lighting device 1 according to a second embodiment of the invention. The lighting device comprises a lamp/reflector unit 35 as a light source 3 with a light emitting element 5 positioned in a reflector body 9. The lamp/reflector unit, during operation, generates a converging beam of light 11 which subsequently is incident on a reflective optical device 13. Said optical device comprises a plurality of facets, the average orientation of the facets defines an optical axis 17. The plurality of facets are sub-divided into a first 16a, a second 16b, third 16c and fourth group of facets 16d. Each group of facets has a respective group optical axis 17a-17d, of said axes at least one pair is mutually angled by an angle β, β' of at least 5°, in the figure between group optical axes 17a-17b β=15° and between group optical axes 17c-17d β'=10°. Each facet redirects via reflection a light beam (or light ray) incident on said facet in a specific direction towards a display screen 19, said specific direction being dependent on the tilt angle and azimuth angle of said facet. In the figure the optical device is made of glass, coated with a specularly reflective aluminum layer 23. Note that in the case of a reflective optical device the limitation requirement of TIR (as applicable for refractive optical devices) does not apply. Yet, the tilt angle and angle between adjacent facets could be limited similarly in order to limit the ratio of perimeter wall and facet surface to reasonable values below 4.6. The perimeter/ surface area ratio requirement for the refractive optical device remains equally applicable for the reflective optical device. As is evident form FIGS. 1A-B and 2, the first surface can be essentially flat, or concavely curved or convexly curved towards the light source.

Figure 3:
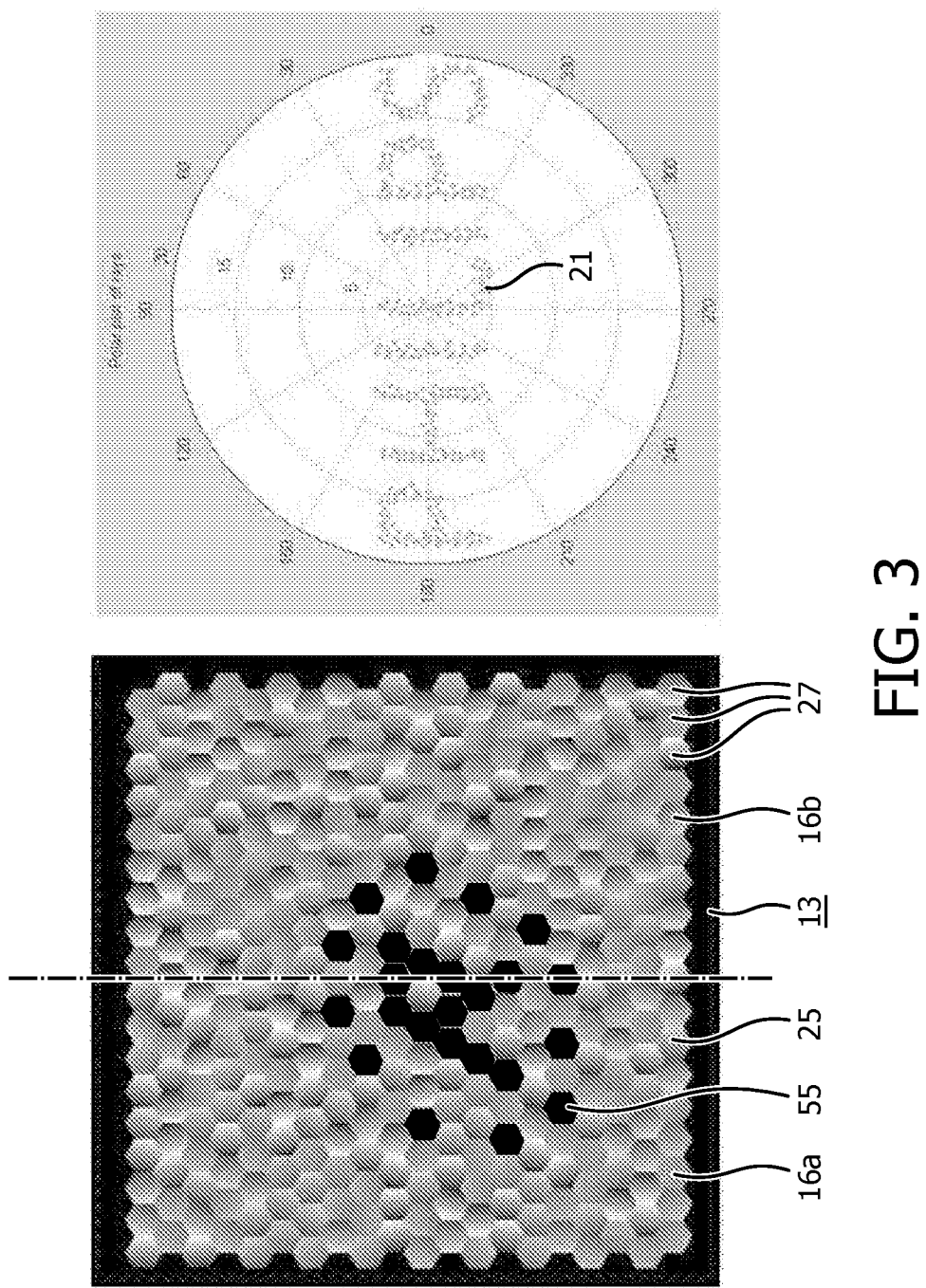
FIG. 3 schematically shows a plan view of an optical device according to the invention suitable to constitute a pattern shown next to it.
Figure 8:
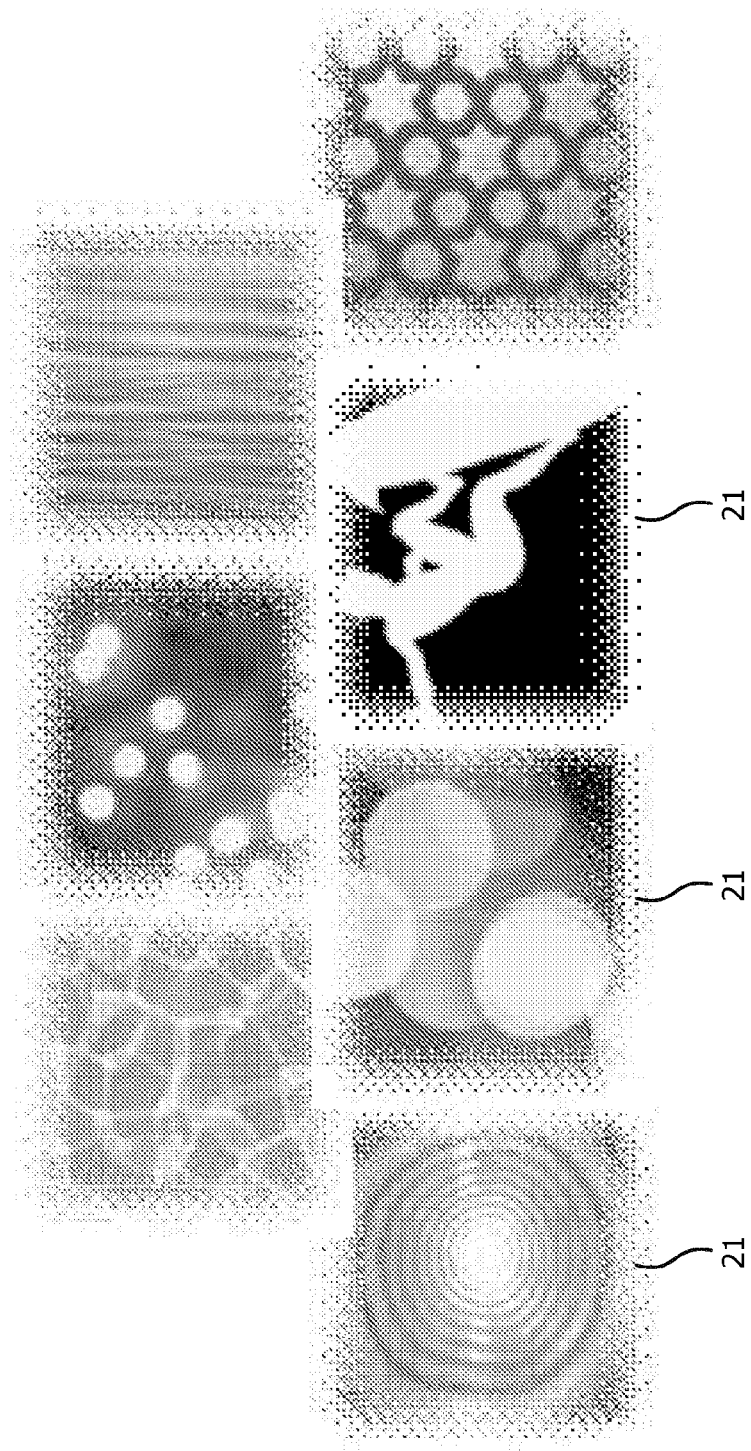
FIG. 8 shows some examples of patterns obtainable by various optical devices according to the invention.

FIG. 3 schematically shows (a part of) a plan view of a first surface 25 of an optical device 13 according to the invention suitable to generate a pattern 21 as shown next to the optical device. The first surface is sub-divided into a first 16a and a second group of facets 16b, the first group of facets randomly building up the part "PHILI" and the second group of facets randomly building up the part "ILIPS" of the pattern "PHILIPS". The first surface is partitioned by regular hexagonal facets (hexagons) 27, the shading of a respective hexagon being an indication for tilt angle α and azimuth angle φ of the facet surface of said hexagon with respect to an optical axis 17 oriented perpendicular to the plane of the drawing. Light incident on said optical device propagates through said optical device and is subsequently refracted by the facets on said partitioned surface to constitute the pattern "PHILIPS", as is shown in the right part of FIG. 3. In principle a practically infinite number of arbitrary patterns can be generated by various optical devices according to the invention. Some illustrative examples are shown in FIG. 8. Note that a projection lens is not needed. As a result, the pattern of light projected onto a wall does not need to be manually focused. It will be in focus irrespective of the distance of the wall to the optical device with facets as long as this distance is large compared to the diameter of the beam of light propagating through the optical device. Furthermore the optical device comprises a watermark 55, i.e. the symbol "®", which for the sake of clarity and as an example is represented by black colored facets.

Figure 4A:
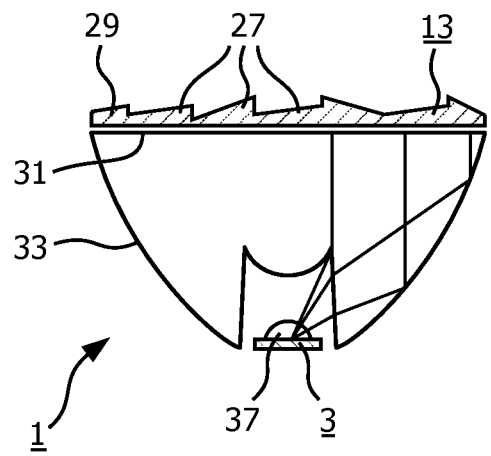
FIG. 4A-4B show two embodiments of a lighting device according to the invention, the one in FIG. 4A shows an optical device provided on a TIR collimator of a LED, the one in FIG. 4B shows a LED as a point light source with a directly associated optical device.
Figure 4B:
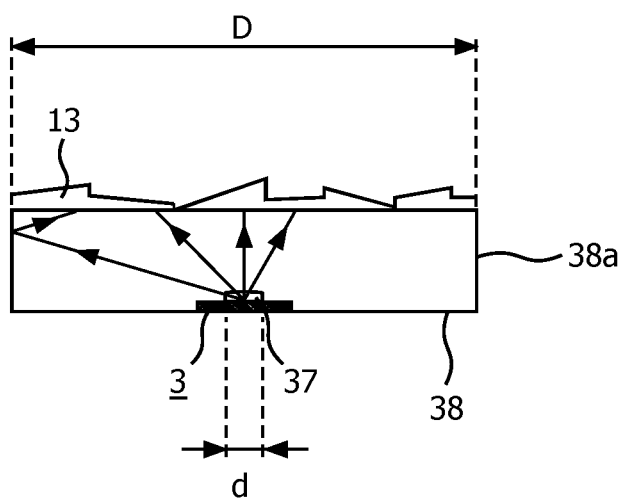

FIG. 4A-4B show two embodiments of a lighting device 1 according to the invention. For the sake of clarity the facets are drawn with oversized dimensions with respect to the dimensions of the optical device. The lighting device 1 in FIG. 4A shows a transparent foil 29 with engraved facets 27 provided as an optical device 13 on an exit surface 31 of a TIR collimator 33 of a LED 37 as a light source 3. The facets can also be embossed directly into the exit surface of the collimator or another optical element. A TIR collimator has a rotationally symmetric shape and relies on total-internal-reflection for the outer part of the beam and on refraction for the inner part. The function of the TIR collimator is to collect most of the light rays emitted by the LED and to reshape them into a parallel beam that has, at each location where rays cross the foil with engraved facets, no or only a small angular spread, i.e. in the figure the spread is less than 5°.

The embodiment of the lighting device 1 in FIG. 4B comprises a LED 37 as a point light source 3 accommodated in a reflective box 38 with a directly associated plate shaped optical device 13 as a first primary optics. The wall 38a of the box could be light absorbing or alternatively could be designed such that light from the LED is reflected in a desired direction towards the optical device 13. Typically the ratio of diameter d of the LED die and the diameter D the optical device is in the order of 10 or more, for example 25, the LED die then is considered a point light source compared to the optical device. Having a light source with a diverging beam can be advantageous as will be illustrated by the next example: Suppose one wants to project a rectangular pattern of light onto a wall. In that case, the distance between the collimator and the wall and the divergence (optionally by means of an additional diverging collimator) of the light source (and optional diverging collimator) can be chosen such that the (collimator and) LED alone project a circle pattern of light on the wall having an area equal to that of the intended rectangular pattern. The function of the plate-shaped optical device with facets is now to simply reshape the circular pattern into a rectangular one with refracting the light only over small angles and hence only facets with relatively small tilt angles are required, thus improving the performance of the optical device. Contrary thereto, in the case the collimator projects a parallel beam into a small spot on the wall, the diverging beam has to be realized only by means of the plate-shaped optical device, i.e. the optical device has to reshape this small spot into a relatively large rectangle and hence to refract over large angles, especially for the corners of the rectangle pattern. This requires facets with a relatively large tilt angles and a more accurate shape, which is a disadvantage.

Figure 5A:
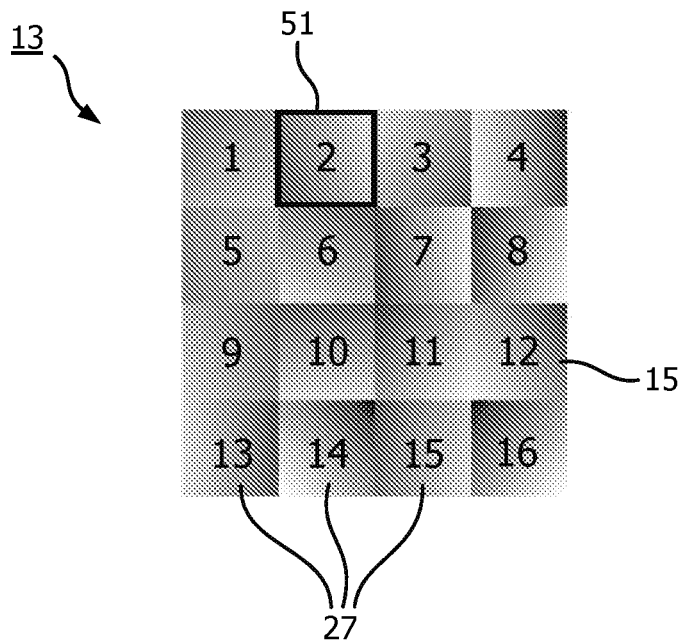
FIG. 5A-5B show positions of facets in an embodiment of an optical device according to the prior art in relationship with their associated positions in the displayed/generated pattern.
Figure 5B:
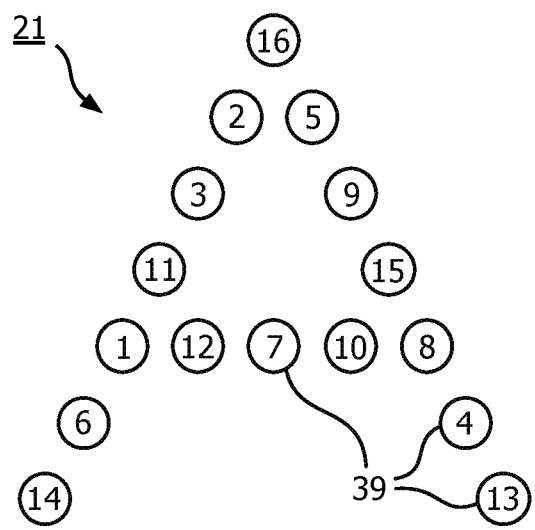

FIG. 5A-5B show positions of facets 27 in an embodiment of an optical device according to the prior art, i.e. in a random in relationship with their associated positions in the displayed/generated pattern 21. Although, for the sake of clarity, only sixteen facets are shown which are distributed over four groups of four facets 16a-d each having a perimeter 53, the optical device 13 may have ten thousand or more facets. One object of the invention is to enable the projection of any desired pattern of light on a wall at some distance from this plurality of facets 15 without GOBO's. FIG. 5A shows a periodic array of facet with each facet numbered, for facet number "2" a perimeter edge 51 is indicated in bold, as an example. Another object of the invention is to make a pattern of light in the far field (i.e. at a relatively large distance from the foil with the facets engraved), for example a pattern that is shaped as the character 'A' as shown in FIG. 5B. This pattern is divided into a number of sub-patterns 39; the same number of sub-patterns as the number of facets. Each of these sub-patterns is given a number. Each facet having a certain number is now linked to or associated with the sub-pattern of the pattern of light that has the corresponding number. Since now the coordinates for each part of the pattern of light on the wall are known, it subsequently is possible to calculate the slope and orientation of the corresponding facet, given the formulas described at FIGS. 10A-B. It is an optional feature of the embodiment that the positions of each facet within the array of facets are randomized, this is shown in FIGS. 5A and 5B.

Figure 6A:
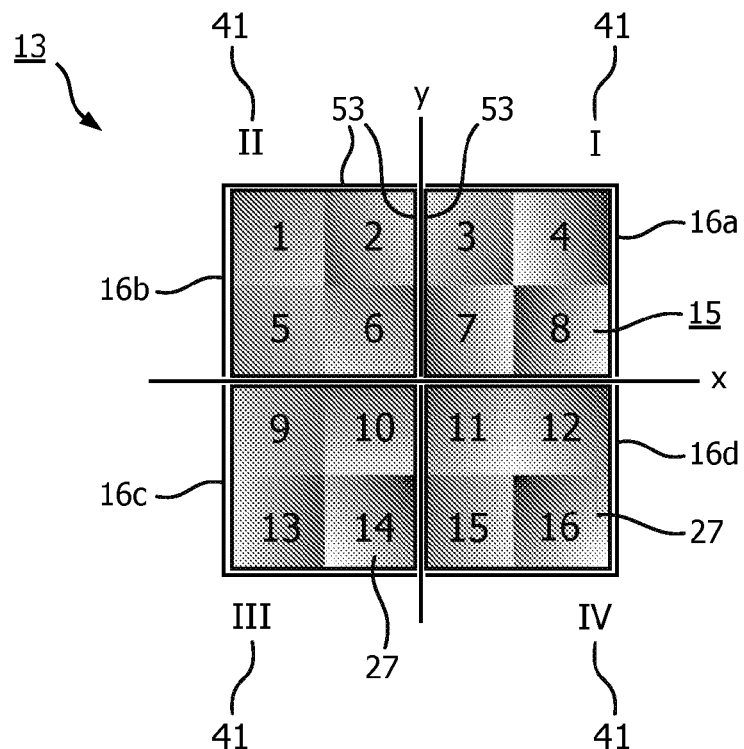
FIG. 6A-6B show positions of facets in an embodiment of an optical device according to the invention in relationship with their associated positions in the displayed/generated pattern, with a sub-division into groups of facets/quadrants.
Figure 6B:
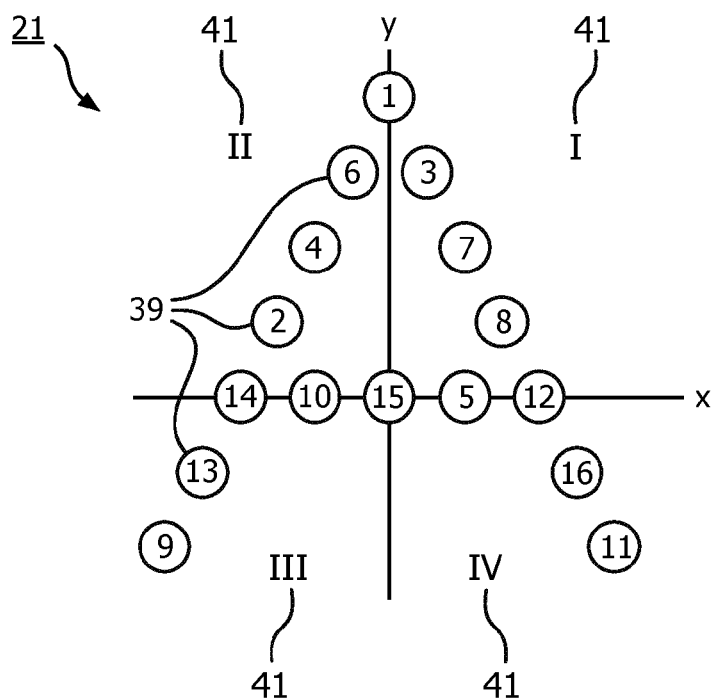

FIG. 6A-6B show positions of facets 27 in an embodiment of an optical device 13 according to the invention in relationship with their associated positions in the displayed/generated pattern 21. Contrary to what is shown in FIGS. 5A and 5B, in FIGS. 6A and 6B the positions of each facet within the plurality of facets 15 are not fully randomized, but are pseudo-randomly associated. In particular, both the first surface with facets of the optical device (FIG. 6A) and the pattern (FIG. 6B) is divided into four quadrants 41, applying a same x,y Cartesian coordinate system on both optical device and pattern. Each quadrant of the optical device forms a group of facets which group is associated with the same, corresponding quadrant in the pattern and in this respect the association of facets with pattern is not random. However, within each group of facets the association of facets with the sub-pattern 39 in the corresponding quadrant again is fully random. Thus a pseudo-random relationship of facets positions with their associated positions in the displayed/generated pattern is obtained. For each group of facets a perimeter 53 is indicated.

Figure 7A:
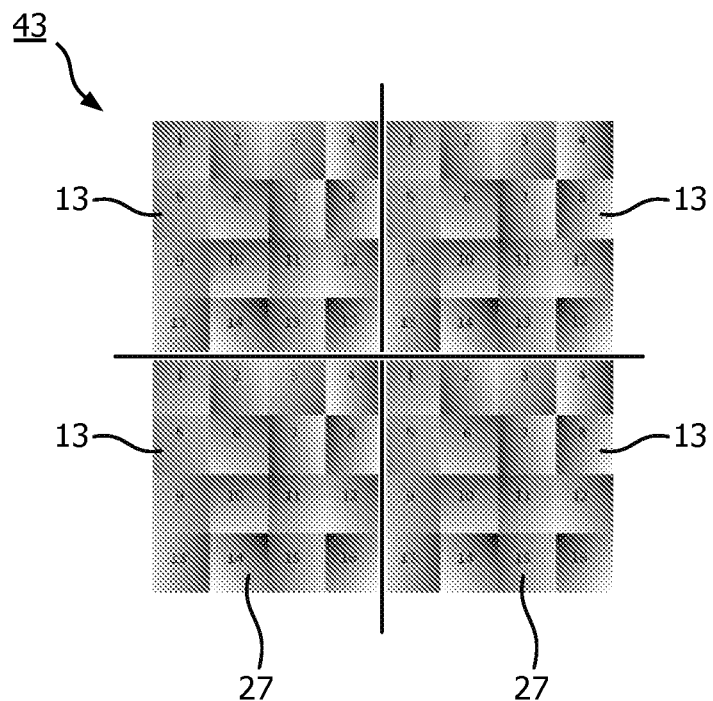
FIG. 7A-7B show a lens according to the invention comprising four optical devices and the pattern as generated by said lens.
Figure 7B:
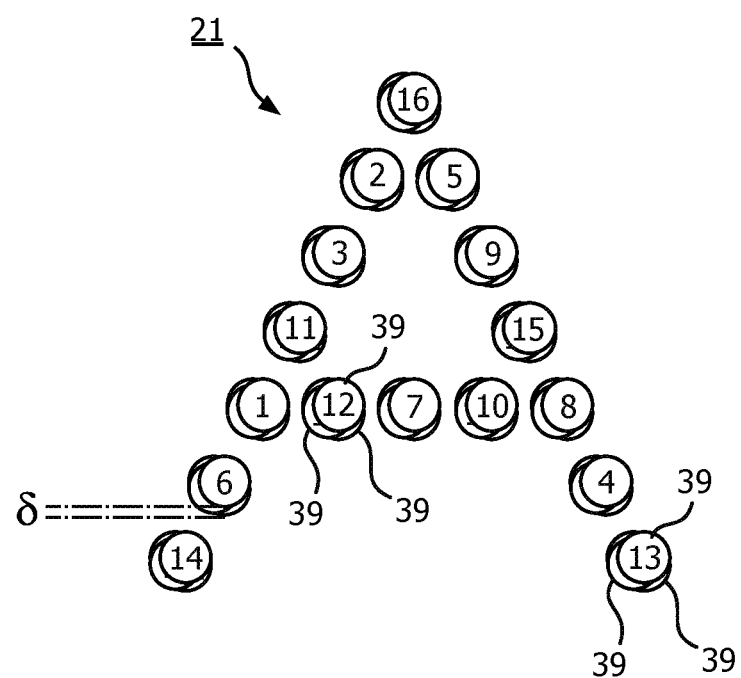

FIG. 7A shows a lens 43 according to the invention comprising four optical devices 13, each optical device comprising sixteen, identically arranged plurality of facets 27, which however, is here only done for the sake of simplicity as in reality each optical device could easily comprise some thousands, for example 5000 facets. Also the lens comprising four optical devices is done for the sake of simplicity, generally a lens could well comprise ten to hundred of identical, or slightly, but essentially different optical devices. As the lens in FIG. 7A has four optical devices with a mutually identical arrangement of facets, the pattern/image 21 as shown in FIG. 7B is constituted four times by the lens when illuminated with a parallel light beam 11. FIG. 7B shows four times the overlapping pattern as constituted by the lens of FIG. 7A. The overlap of super-positioned images is not 100% as a result of a small mutual displacement/shift 6 which is done on purpose to counteract the visibility of stepped edges at dark and light areas of the displayed image. This shift could be in one direction, but could also be done in more directions (as shown in the FIG. 7B) and results in the edges to be more fluent/smooth, the magnitude of δ is of course dependent on the complexity and/or detail of the displayed image (see for example FIG. 8), but generally the overlap of superpositioned images per facet is in the order of 50% to 95%, for example 80%.

Figure 7C:
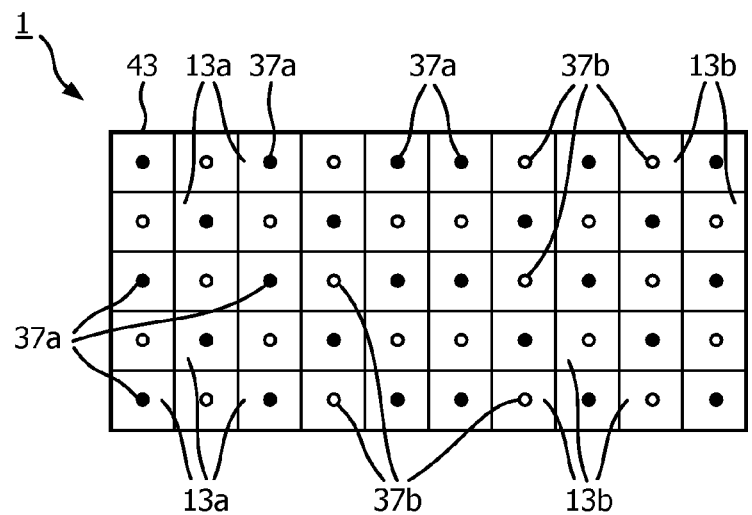
FIG. 7C-7D show a lighting device according to the invention and typical beam patterns as generated by the lighting device.
Figure 7D:
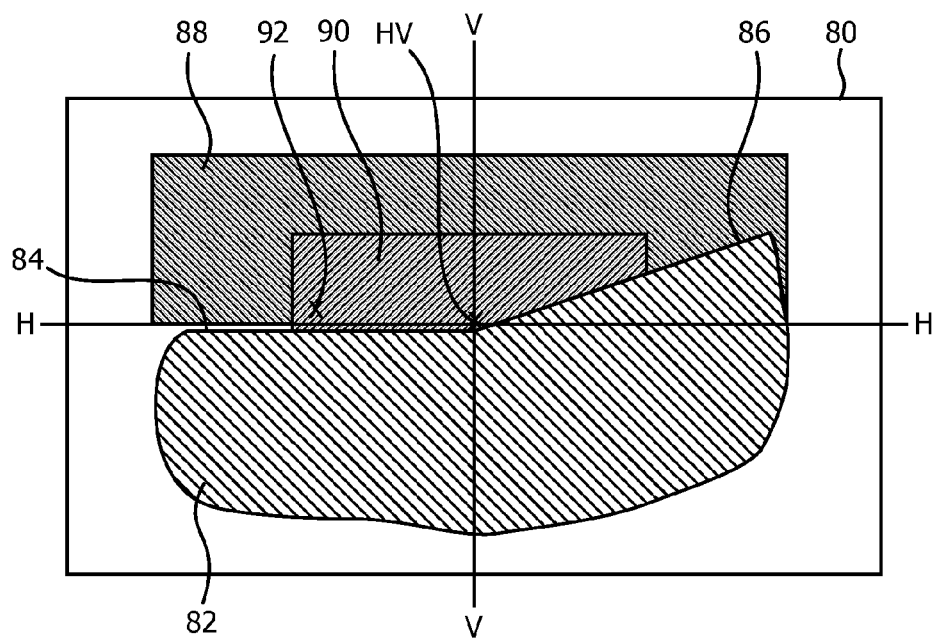

FIG. 7C shows a lighting device 1 according to the invention comprising a lens 43 and, as an example, fifty optical devices 13a,b, the optical devices 13a forms a first set of optical devices comprising identically arranged plurality of facets, similarly optical devices 13b forms a second set of optical devices comprising identically arranged plurality of facets different from the set of optical devices 13a. The number of LEDs and their respective associated optical devices amounts for example 25, 50 or 100 LEDs and 25, 50 or 100 essentially identical optical devices on one lens. The lens in FIG. 7C has a first set of twenty-six optical devices 13a associated with a with a first set of twenty-six LEDs 37a with a mutually identical arrangement of facets, the pattern/image part 82 as shown in FIG. 7D is constituted twenty-six times by the lens when illuminated by the first set of LEDs 37a. The pattern/image parts 88 and 90 are to be constituted by the second set of twenty-four LEDs 37b and their associated set of twenty-four optical devices 13b. In the embodiment shown in FIGS. 7C-D, the two sets of combinations 13a-37a and 13b-37b together constitute a high beam of the motor headlight device during operation of both combinations. Alternatively it is possible that one combination, for example 13b-37b issue a dim light beam, and that the other combination, for example 13a-37a as such issues a high beam, the combination 13b-37b then being switched off. Such an essentially interdigitated (or more or less alternating) arrangement of two combinations of LEDs and associated optical devices is in particularly suitable in luminaires enabling it to issue a narrow beam light (spot-like), a broad beam light (flood light), for example a batwing-shaped light beam, or the combination of narrow and broad beam light. Yet the luminaire in all operation conditions has a practically constant appearance and emits light in a homogeneous way from its whole light emission window. Such a device/luminaire could be considered as an invention as such.

FIG. 7D shows the dim light beam pattern as issued by a motor headlight device which is built up according to the principle as shown in FIGS. 7A and 7C, hence without screening part of the light beam as is generally the case in conventional motor headlights. A measuring screen 80 is arranged in FIG. 7D at a distance in front of the headlight and is illuminated by the light emitted by the headlight. Horizontal central plane of the measuring screen 80 is identified as HH and the vertical central screen is identified as VV. The horizontal central plane HH and the vertical central plane VV intersect one another in a point HV. The light which is emitted by the light source illuminates the measuring screen 80 in a region 82. The region 82 is limited from above by a dark-light limit produced by the specific redirecting properties of the lens in total, i.e. by superposition of all the light beams as issued by each respective LED in combination with its associated respective optical device. The shown embodiment, the headlight is determined for the right traffic and the bright-dark limit has on the counter traffic side, or at the left side of the measuring screen 80 a portion 84 which extends substantially horizontally under the horizontal central plane HH. At the traffic side, or in other words at the right side of the measuring screen 80, the bright-dark limit has a raising portion 86 which extends from the horizontal portion 84 to the right edge of the measuring screen 80 or the horizontal central plane HH outwardly. Alternatively, the bright-dark limit at the traffic side can have a portion which is arranged higher than the portion 84 and is also horizontal. The distribution of the illumination intensities in the region 82 is provided by legal considerations, and in a zone under the point HH the highest illumination intensities are available. The measuring screen 80 above the bright-dark limit 84, 86 is not illuminated or poorly illuminated by the light as issued by the LEDs 13a and redirected by the optical devices 37a of the lens 43. For example, in view of acting ECE regulations a measuring point 92 is defined, in which the illumination intensities amounts maximum to 0.4 lux, to avoid a blinding of the counter traffic. The illumination intensity distribution can be selected for example so that in a region 90 located directly above the bright-dark limit 84, 86 on the measuring screen 80, which extends for example up to approximately 2° above the horizontal central plane HH and under substantially 4° at both sides of the vertical central plane VV, the light as issued by the headlight illuminates only poorly. The falling region 88 which is located above and laterally over the region 90 extends for example vertically above up to 4° over the horizontal central plane HH and laterally at both sides of the vertical central plane VV up to substantially 80° and is stronger eliminated in the region 90.

It is an optional feature of the embodiment that the positions of each facet within each of the optical devices are randomized. This has the advantage that in case the transparent foil having many of such facets engraved in it, and is illuminated with a narrow beam of light, the light will cross a few facets only. The result is that only a fair representation of the desired pattern of light is obtained. In case the beam is broadened, the light of the beam will cross more facets and the representation of the pattern of light improves. In other words, randomizing the position of each facet within the array of facets makes that the foil with facets behaves in a predictable manner: the more facets are illuminated, the better the quality of the pattern of light on the wall. In this respect, the inventive optical device has a strong similarity to the behavior of a hologram. However, contrary to holograms the inventive optical also works well for white light (i.e. a broad spectrum of light), but is not limited thereto, and appears to be wave-length independent. This is an advantage over diffractive diffusers since diffractive diffusers are tuned to a particular wavelength and have decreased efficiency at different wavelengths. Also in the case the beam is not homogeneous, the randomization of the positions of the facets takes care that yet a good representation of the pattern of light on the wall is obtained.

Figure 9A:
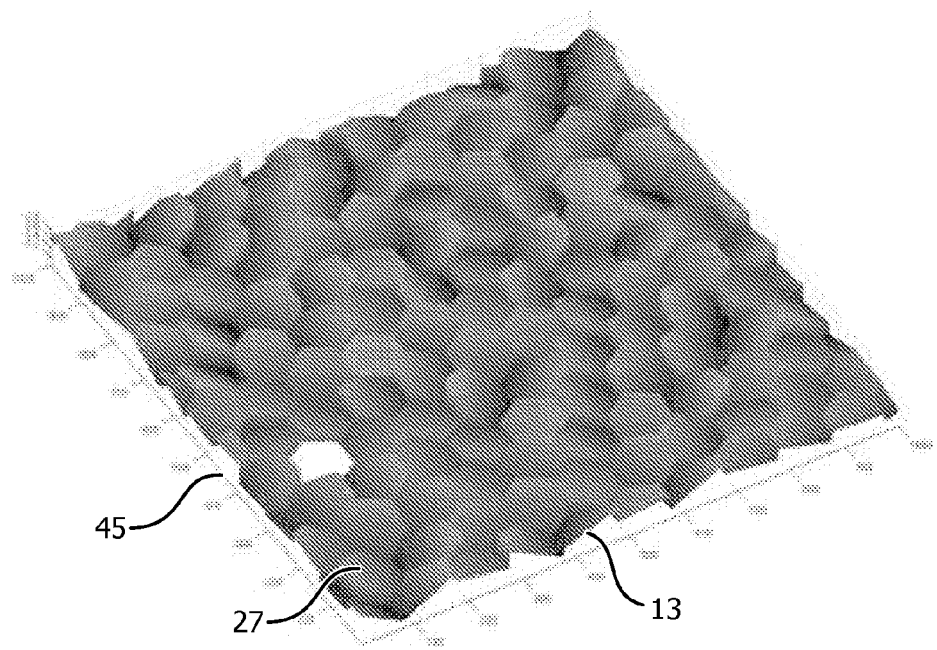
FIG. 9A shows a 3D plot of an optical device according to the invention with an array of facets having a regular hexagonal shape.
Figure 9B:
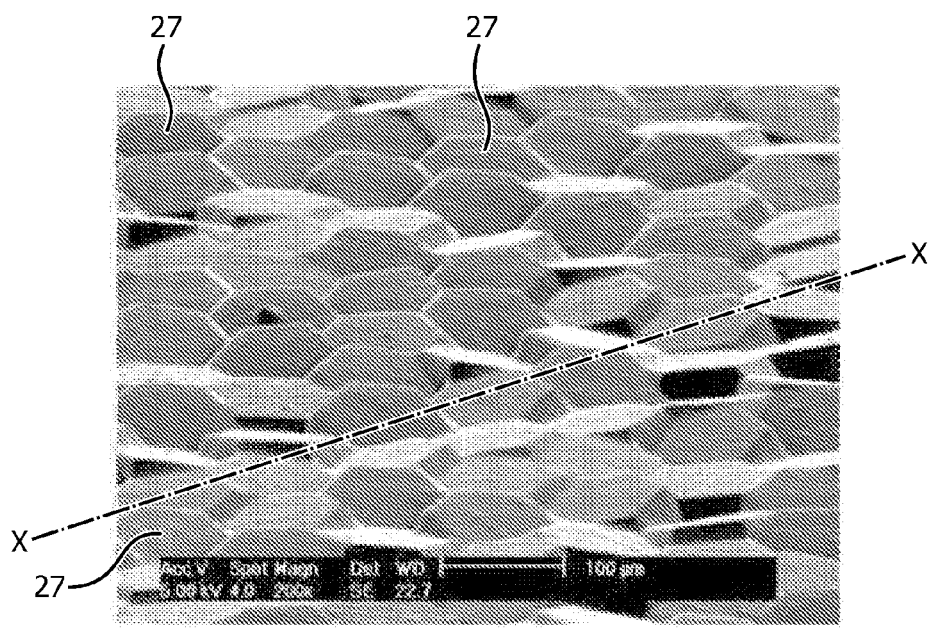
FIG. 9B shows a scanning electronic microscope image of a part of a physical optical device according to the invention as shown in FIG. 9A.

FIG. 9A shows a computer calculated 3D plot 45 of an optical device 13 according to the invention with a plurality of facets 15 having a regular hexagonal shaped facet surface. FIG. 9B shows a scanning electronic microscope image of a part of a physical optical device according to the invention as shown in FIG. 9A. The meaning of the characteristics 'tilt', 'azimuth' and 'orientation' of facet surfaces 27a, 27b of facets 27 are clearly shown in FIGS. 9A-B. A cross-section of the physical optical device of FIG. 9B along line X - - - X is shown in FIG. 10A.

Figure 10A:
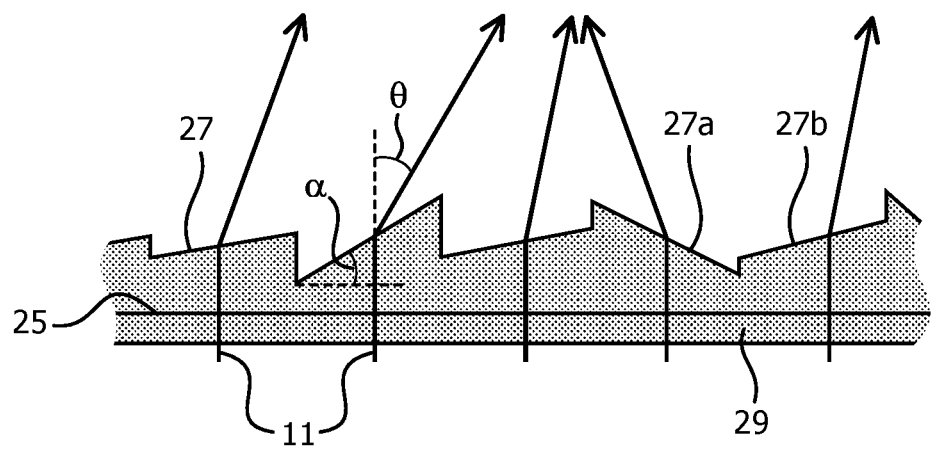
FIG. 10A-B show abstracted (mathematical) representations of physical parameters as facet, tilt angle, azimuth angle and orientation angle.
Figure 10B:
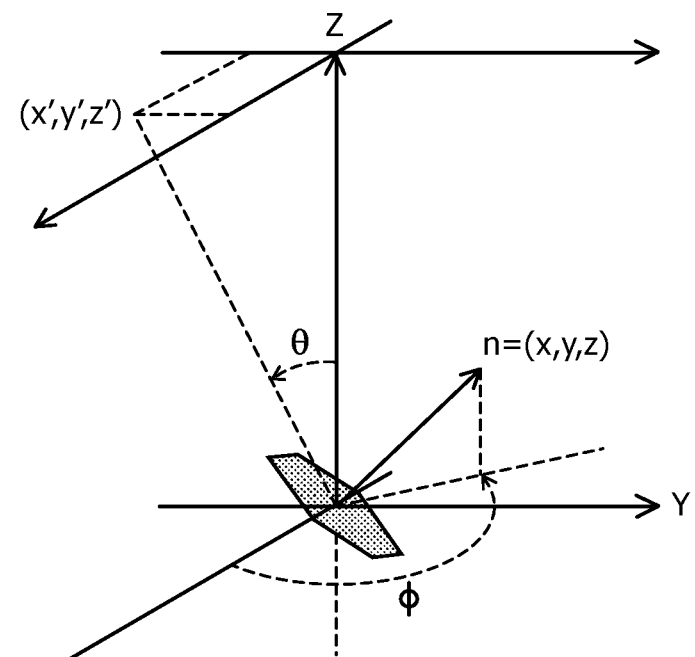

As is shown in FIG. 10A, from an optics point of view, the function of each facet 27 is to redirect the rays of light that are transmitted by this facet. Each facet 27 has a respective facet surface 27a,27b. Said facet surfaces 27a,27b have a respective normal vector 28a,28b, which normal vectors, for adjacent facet surfaces, preferably are mutually angled at at least γ=3°. In the example shown in the figure, γ=45° for the normal vectors 28a,28b of the adjacent facet surfaces 27a, 27b.

It is assumed that a parallel beam of light 11 issued by a plurality of light emitting elements or light sources (not shown) and is directed perpendicular to an optical device comprising a thin transparent foil 29 having a first surface 25 with facets 27 engraved into it. Each individual facet will intercept an equal part of the parallel beam of light and redirect it.

Given a vector, n=(x,y,z), normal to a facet, the slope (tilt angle α) and rotational orientation (azimuth angle φ) of this facet are (see also FIG. 10B):

$$\alpha = \tan^{-1}\left(\frac{\sqrt{x^2 + y^2}}{z}\right),$$
$$\phi = \tan^{-1}(y/x).$$

The angle θ, into which the light intercepted by this facet will be redirected follows from the relation:

θ=a sin(n sin(α))−α.

In this relation, n is the index of refraction of the material the transparent substrate is made of Given both θ, φ, as well as the distance z' to a wall that intercepts the light redirected by this facet, the position (x',y') at which the light hits the wall follows simply from the relations:

x'=z' tan(θ)cos(φ+π), y'=z' tan(θ)sin(φ+π).

Hence, a collection of facets engraved in a transparent substrate and its effect on a beam of light is described.

Figure 11:
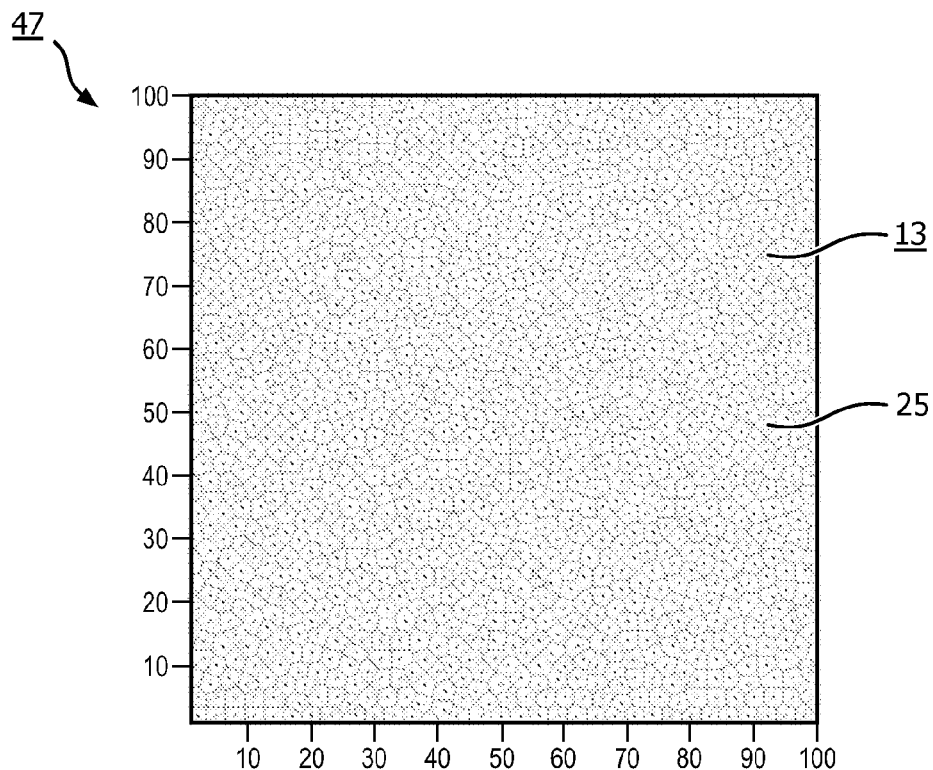
FIG. 11 shows a Voronoi surface partition of a first surface of an optical device according to the invention as obtained by a method according to the invention.
Figure 12:
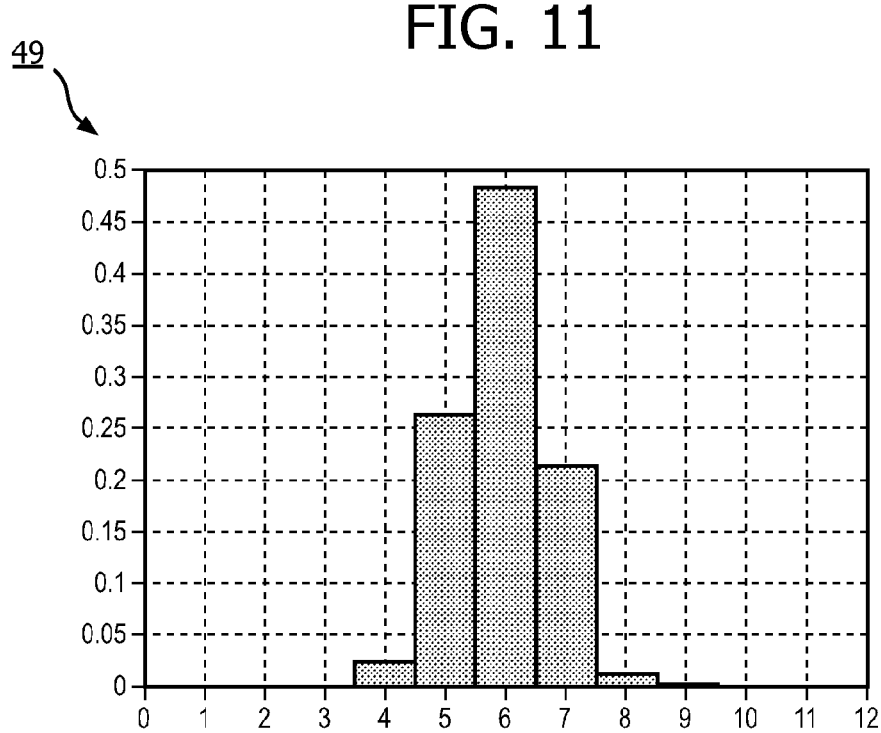
FIG. 12 shows a histogram of the number of facets with n-nodes of the optical device of FIG. 11.

FIG. 11 shows a Voronoi surface partition 47 of a first surface 25 of an optical device 13 according to the invention as obtained by a method according to the invention. Instead of partitioning the first surface into a grid of squares, it is to be preferred to partition it into polygons of, on average, more nodes than four, more preferably the polygons are convex. To obtain n facets 27, firstly n dots in a plane are drawn. If facets of more or less constant size are desired, the dots are drawn such that they are more or less equally spaced. If, on the other hand, varying sizes are wanted, the distance between the dots is varied. A large density of vertices will result in small facets, a small density of dots in large facets. Subsequently, Fortune's algorithm is applied to obtain a Voronoi diagram for the nodes. This diagram can be interpreted as a plate of facets: each cell of the Voronoi diagram corresponds to a facet. Finally, of the facets thus obtained, the orientation of each facet has to be determined in dependency on the total pattern to be displayed and the sub-pattern to be displayed by a respective facet. FIG. 11 gives an example of a Voronoi diagram. FIG. 12 shows for this diagram a histogram 49, with the number of nodes in the polygons on the x-axis and the fraction (or percentage) occurring with said number of nodes on the y-axis. It shows that the facets resulting from the Voronoi diagram have the advantageous property that many of them have many nodes, i.e. at least five.

Figure 13A:
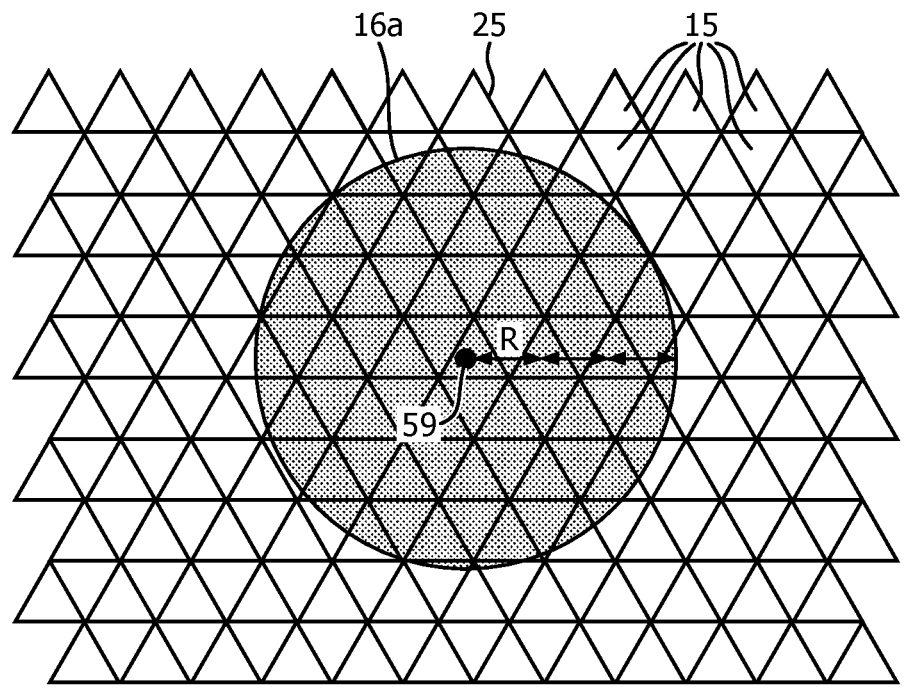
FIG. 13A-B show examples how to determine group of facets.
Figure 13B:
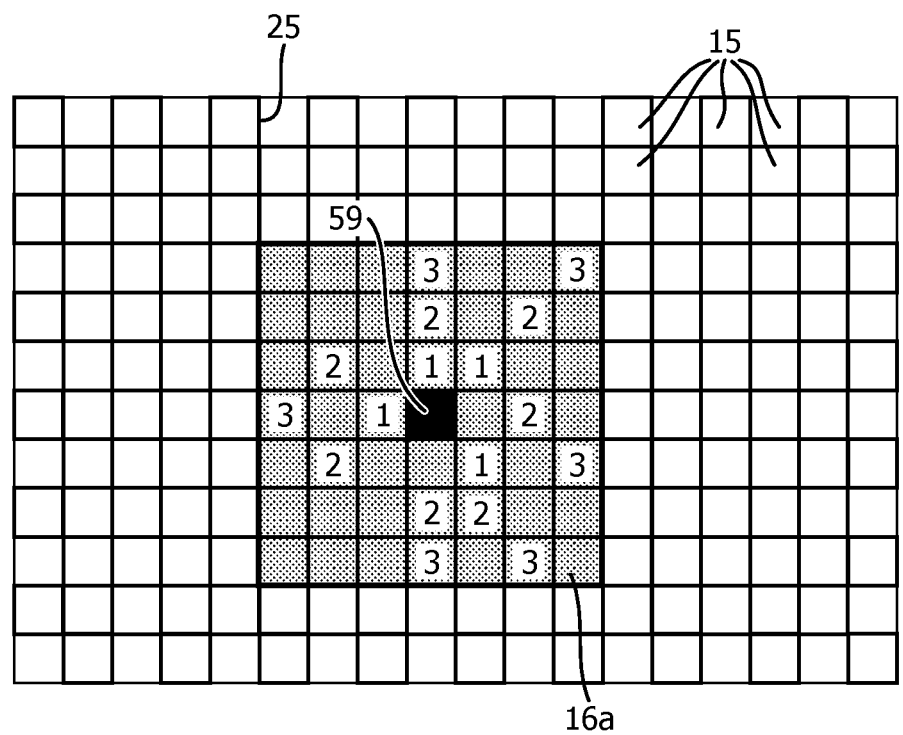

FIG. 13A-B show some examples how to (virtually) divide the plurality of facets 15 on the first surface 25 into a group of facets 16*a* is to consider one selected facet 59, preferably not at the border of the first surface. At least all the facets that can be reached in three steps over adjacent/bordering facets, as shown in FIG. 13B by the numbers 1, 2, 3, or that are within a distance of <=3* averaged facet size from said selected one facet, as shown in FIG. 13A and indicated as R, are considered to be part of said group of facets. This method automatically renders the groups of facets to be compactly arranged and have more or less the same size and shape.

Reference has been made to preferred embodiments in describing the invention. However, additions, deletions, substitutions, or other modifications which would fall within the scope of the invention defined in the claims may be implemented by those skilled in the art without departing from the spirit or scope of the invention. Accordingly, the invention is not to be considered as limited by the foregoing description, but is only limited by the scope of the appended claims.

The invention claimed is:

1. A lighting device comprising at least two optical devices associated with a light source, each optical device comprising a surface with a plurality of micro-sized facets having a size in between 25 µm to 250 µm, each facet having a normal vector defining a respective orientation of the facet, an average of the normal vectors for all said plurality of facets in one of the optical devices defining an optical axis for said one of the optical devices;
   wherein each of the optical devices is configured to project light from the light source along its optical axis to form an image pattern on a display screen, and
   wherein the image pattern of one of the optical devices overlaps with the image pattern of another one of the optical devices by superposition,
   wherein each facet for all of said plurality of facets in one of the optical devices has a tilt angle with respect to the optical axis for said one of the optical devices within a range determined by equation: $\alpha_t <= 0.8 * \alpha_c$, where $\alpha_t$ is the tilt angle and $\alpha_c$ is a critical angle for total internal reflection.

2. The lighting device as claimed in claim 1, wherein each of the optical devices is arranged to display a sub-pattern of a displayed pattern during operation of the lighting device.

3. The lighting device as claimed in claim 1, wherein the at least two optical devices essentially have the same size and/or the same shape.

4. The lighting device as claimed in claim 1, wherein the at least two optical devices comprise first and second sets of optical elements, a ratio between a quantity of the optical elements in the first set and a quantity of the optical elements in the second set is in the range of 1:1 to 1:10.

5. The lighting device as claimed in claim 1, wherein the at least two optical devices are made in one piece of material.

6. The lighting device as claimed in claim 1, wherein the lighting device is a luminaire in which a narrow beam is to be issued by at least a first one of the optical devices and a wide beam is to be issued by at least a second one of the optical devices.

7. The lighting device as claimed in claim 1, wherein the lighting device is a motor headlight in which a dim beam is to be issued by at least a first one of the optical devices and a high beam is to be issued by either at least a second one of the optical devices or by at least the first set and the second set of the optical devices.

8. The lighting device as claimed in claim 1, wherein the lighting device is a lamp/reflector unit which is switchable between at least a first beam to be issued in a first direction by at least a first one of the optical devices and a second beam to be issued in a second direction different from the first direction by at least a second one of the optical devices.

9. The lighting device as claimed in claim 1, wherein the light source during operation serves as a point light source or as a generator of a parallel light beam.

10. A system comprising a plurality of the lighting devices as claimed in claim 1.

11. A method of making the lighting device as claimed in claim 1, the method comprising the steps of:
   selecting the desired image pattern to be displayed;
   dividing the desired image pattern into sub-patterns with specific locations;
   determining at least one group of facets and configurations of the plurality of facets the group of facets comprising a group optical axis for directing portions of light from a light source to the sub-pattern locations, wherein the sub-patterns are configured to project the light of the light source onto a display screen to form different image patterns that overlap by superposition, and wherein each facet of the at least one group of facets has a tilt angle relative to the group optical axis where the tilt angle is within a range determined by equation $\alpha_t <= 0.8 * \alpha_c$, where $\alpha_t$ is the tilt angle and $\alpha_c$ is a critical angle for total internal reflection; and
   generating the facets on the optical devices, according to the determined configurations.

12. The lighting device as claimed in claim 5, wherein the optical devices are made from a foil or plate.

13. A lighting device, comprising:
   a light source for emitting light;
   a first optical device having a first surface with a plurality of first facets; and
   a second optical device having a second surface with a plurality of second facets;
   wherein each of the first and second facets has a normal vector defining an orientation thereof, an average of the normal vectors for the first facets defining an optical axis of the first optical device, and an average of the normal vectors for the second facets defining an optical axis of the second optical device;
   wherein the first optical device projects the light from the light source along said optical axis of the first optical device to form a first pattern on a display screen;
   wherein the second optical device projects the light from the light source along said optical axis of the second optical device to form a second pattern on the display screen;
   wherein the first and second patterns overlap by superposition; and wherein each of the first and second facets has a tilt angle relative to the optical axes of the first and second optical devices, respectively, where the tilt angle is within a range determined by equation $\alpha_t <= 0.8*\alpha_c$, where $\alpha_t$ is the tilt angle and $\alpha_c$ is a critical angle for total internal reflection.

14. The lighting device of claim 13, wherein each of the first and second facets has a size in between 25 μm to 250 μm.

15. The lighting device of claim 13, wherein the first and second patterns are superimposed with each other on the display screen.

16. The lighting device of claim 13, wherein the first pattern is different from the second pattern.

17. The lighting device of claim 13, wherein the optical axis of the second optical device is not parallel with the optical axis of the first optical device.

18. The lighting device of claim 13, wherein the first and second facets are arranged in a mutually alternating manner.

19. A lens comprising at least two sets of optical elements, wherein the at least two sets of optical elements are designed to project different image patterns on a display screen during operation, wherein the different image patterns overlap by superposition, and wherein different sets of the optical elements are arranged neighboring one another in a mutually alternating manner, and at least one set of the at least two sets of optical elements comprises a plurality of facets, each facet having a tilt angle relative to an optical axis of the lens within a range determined by equation: $\alpha_t <= 0.8*\alpha_c$, where $\alpha_t$ is the tilt angle and $\alpha_c$ is a critical angle for total internal reflection.

* * * * *